United States Patent [19]  
Anderson

[11] 4,186,931  
[45] Feb. 5, 1980

[54] PIPE END SEALING SYSTEM

[76] Inventor: Kenneth W. Anderson, 20 White Fence Acres, Rochester, Ill. 62563

[21] Appl. No.: 856,761

[22] Filed: Dec. 2, 1977

[51] Int. Cl.² ............... F16J 15/10; F16L 21/02
[52] U.S. Cl. .................... 277/207 A; 277/186; 285/230; 285/231; 285/291; 285/345
[58] Field of Search .............. 277/181–183, 277/186, 189, 207 A; 285/21, 230, 231, 291, 345, 347, 374

[56] References Cited

U.S. PATENT DOCUMENTS

| 1,976,589 | 10/1934 | Trickey | 277/207 A X |
|---|---|---|---|
| 2,401,554 | 6/1946 | Davids | 285/291 |
| 2,537,659 | 1/1951 | Eisner et al. | 285/291 X |
| 2,722,438 | 11/1955 | Kennison | 277/207 A X |
| 3,135,519 | 6/1964 | Ligan et al. | 285/231 X |
| 3,228,425 | 1/1966 | Pacella | 285/291 X |
| 3,738,689 | 6/1973 | Forni | 285/230 X |
| 3,759,285 | 9/1973 | Yoakum | 285/230 X |
| 3,912,285 | 10/1975 | Swanson et al. | 277/207 A X |
| 3,973,783 | 8/1976 | Skinner et al. | 277/207 A X |
| 4,084,828 | 4/1978 | Jones | 277/207 A |

FOREIGN PATENT DOCUMENTS

| 269007 | 3/1969 | Austria | 277/207 A |
|---|---|---|---|
| M27470 | 10/1956 | Fed. Rep. of Germany | 285/374 |
| 1334436 | 7/1963 | France | 285/291 |
| 1083852 | 9/1967 | United Kingdom | 285/291 |

Primary Examiner—Robert S. Ward, Jr.  
Attorney, Agent, or Firm—LeBlanc, Nolan, Shur & Nies

[57] ABSTRACT

An end sealing member joined to the ends of a pipe for cooperation with a complementary end sealing member on another pipe to seal the joint formed when at least two such pipes are joined in end-to-end relationship. Each end sealing member has upstanding members extending into the surface of the pipe to seal the interface between the sealing member and the pipe to which it is secured. The exposed surface of one sealing member is configured to sealingly engage the exposed surface of a complementary sealing member when the one sealing member is telescoped over the other in forming the joint between the two pipes.

10 Claims, 7 Drawing Figures

PIPE END SEALING SYSTEM

BACKGROUND OF THE INVENTION

In conduit assemblies and particularly conduits formed from material for use as sewer pipes and the like, the pipes are typically joined end-to-end and provided with a sealing means to seal the joints from the fluid flowing inside the pipe. With nonmetallic pipes, such as concrete, special sealing means are employed to achieve the desired seal at the joint. The seals employed heretofore have been steel ring inserts secured to the ends of the concrete pipe and configured to hold rubber gaskets such that, when the pipes are joined, the gaskets will be compressed to seal the joint. In manufacturing pipes with sealing inserts, the inserts have been included with the concrete pipe forms and in a manner which allows the slurry to flow into the form and harden to hold the insert in place, after the forming process is complete.

An example of these sealing systems include the U.S. Pat. to Bower No. 3,858,912. This Bower patent relates to the use of inserts for nonmetallic pipes where each insert has a groove for receiving an O-ring type sealing member. Each of these inserts has flanges at the ends of the inserts whose primary purpose is to inhibit the accumulation of concrete into these grooves during the forming process. In addition, these flanges serve to anchor the inserts in place. There is also ancillary reference made to the use of these flanges along with the groove as inhibiting leakage between the inserts and the concrete pipe. The U.S. Pat. to Cleverly No. 2,770,476 employs plastic inserts, one in the bell end and another in the spigot end of the pipe, to seal the joints formed when the bell end is telescopically engaged over the spigot end of a complementary pipe. Annular grooves are provided in the bell wall of the pipe allowing the bell insert to be secured in interlocking relationship with the pipe.

The U.S. Pat. to Elder et al, No. 3,764,151, relates to a multibore concrete section of the bell and spigot type pipe formed integrally with preformed end liners or inserts. These inserts are arranged within a mold to be molded in place as the pipe is formed by pouring the slurry into the mold. These inserts are held in place by stages and platens during the molding process.

Other prior art showing joining systems include the following U.S. Pat. Nos. 2,995,322 to Hite, Oct. 11, 1960; 3,201,136 to G.C. Harrison et al., Aug. 17, 1965; 3,503,636 to Bower, Mar. 31, 1970; 3,516,447 to Pittman, Jr., June 23, 1970; 3,592,481 to Jeffery et al, July 13, 1971; and 3,807,744 to Gibling, Apr. 30, 1974.

There are several problems associated with pipe sealing systems which have not been overcome by the prior art cited above. The sealing ends incorporated with the pipes which have characterized the prior art, although achieving some seal, have failed to achieve the smooth surface-to-surface engagement which ensures a good seal in the joints over substantial periods of time. In addition, many of these seals do not effecitvely seal the interface between the end seal and the pipe to which it is attached. As a result, although the joint can be sealed between the two end seals, another path along this interface is available for possible leakage negating the effect of the end seals. This problem has not been effectively overcome by the prior art discussed above. Further, some of the seals disclosed above are not efficient from an economic standpoint. For example, some of the seals call for unusually convoluted configurations which are expensive to mold and difficult to employ properly. Many of the seals which have characterized the prior art are not properly secured to the end portion of the pipe. The result is that they may break away during the joining operation or some time after the joint has been made.

SUMMARY OF THE INVENTION

Generally, the invention relates to end sealing members which are joined to the ends of pipe for cooperation with a complementary end sealing member on another pipe to seal the joint formed between these pipes when joined in end-to-end engagement. More specifically, the type of pipe contemplated herein is a pipe which has a spigot end and a bell end. The spigot end has a spigot end sealing ring which includes an exposed surface and an interfacing surface. The bell end has attached thereto a bell end ring which also has an exposed surface an an interfacing surface. In both of these sealing rings, the interfacing surface is joined to the pipe with the exposed surface being available for sealing with the complementary exposed surface on the other sealing ring when the pipes are joined together.

As explained in more detail in the description of the preferred embodiment the bell end sealing ring has on its interfacing surface a series of upstanding ridges spaced apart from each other and extending into the bell end of the pipe. The bell end of the pipe has an end surface at the very end of the pipe and an offset end surface which is displaced radially inwardly and spaced axially from the end surface. Into an inner surface joining the offset surface and the end surface there is molded into the pipe the bell end sealing ring. Similarly, the spigot end sealing ring has on its interfacing surface a series of ridges spaced apart fom each other and extending into the spigot end of the pipe. The spigot end has an end surface and an offset surface but its offset surface extends radially outwardly rather than inwardly as with the bell end. The spigot end ring is molded into an outer surface joining the end surface and the offset surface. With this configuration, the offset surface of one pipe registers with the end surface of the other pipe, and the inner and outer surfaces are concentric about one another.

The spigot end ring further defines about its circumference a groove for receiving a flexible O-ring sealing member. In operation, the O-ring is included in the groove of the spigot end. When the spigot end of one pipe with its sealing ring is slid into engagement with the bell end of another pipe with its sealing ring, the exposed surface of the spigot end sealing ring is in substantial contact with the exposed surface of the bell end sealing ring. In this way, the O-ring is compressed to seal the joint and the joint is further sealed by the close engagement of the exposed surfaces of each end ring.

In addition, because of the upstanding members, the interface between the sealing rings and the pipes are also sealed substantially along their entire length from any leakage. These upstanding members are comprised of a sufficiently plastic material to allow for compression and deformation of the ridges during the forming of the pipe.

In addition to the above, the invention relates to pallet forming members used in the molding process of the pipe to hold the sealing rings in place while the pipe is being formed so that the sealing rings can be molded directly into the ends of the pipe. The pallet forming members are of a configuration such that they can be adapted to the normal molding processes used in making pipes with spigot and bell ends.

From the above configuration and process, it can be seen that the end rings are of a simple but yet extremely effective and functional configuration to provide a seal between the joints of pipes laid end-to-end. In addition, the configuration is one which ensures an effective seal along the interface between the sealing rings and the pipe as well as ensuring that the rings are maintained in position during the joining of the pipe and subsequently thereafter when the joined pipes are used.

It is an object of this invention to arrive at a more effective seal for pipes joined in end-to-end relationship and to ensure a longer lasting seal at the joint of the pipes.

It is another object to achieve a seal which is economical to manufacture and yet ensure a more effective seal.

Also, it is an object to configure end seal rings to facilitate proper engagement of the exposed surfaces of these rings when the bell end is telescoped over the spigot end.

Another object of the invention described herein is to effectively seal the interface between a sealing ring and the end of a pipe to which it is fixed.

A further object is a sealing ring which can be molded securely to the end of a pipe during the forming process and simultaneously maintain an effective seal along the interface between the sealing end ring and the end of the pipe.

A still further object is to employ forming pallets which can support the sealing rings without undue change in the present forming methods for making concrete pipe and the like.

The above-mentioned objects are only a few of the objects to which this invention is directed. The full scope of the invention is defined in the claims which follow. Furthermore, other objects will be apparent from the detailed description of the preferred embodiment hereinafter.

DETAILED DESCRIPTION OF THE PREFERRED EMBODIMENT

Figure 7:
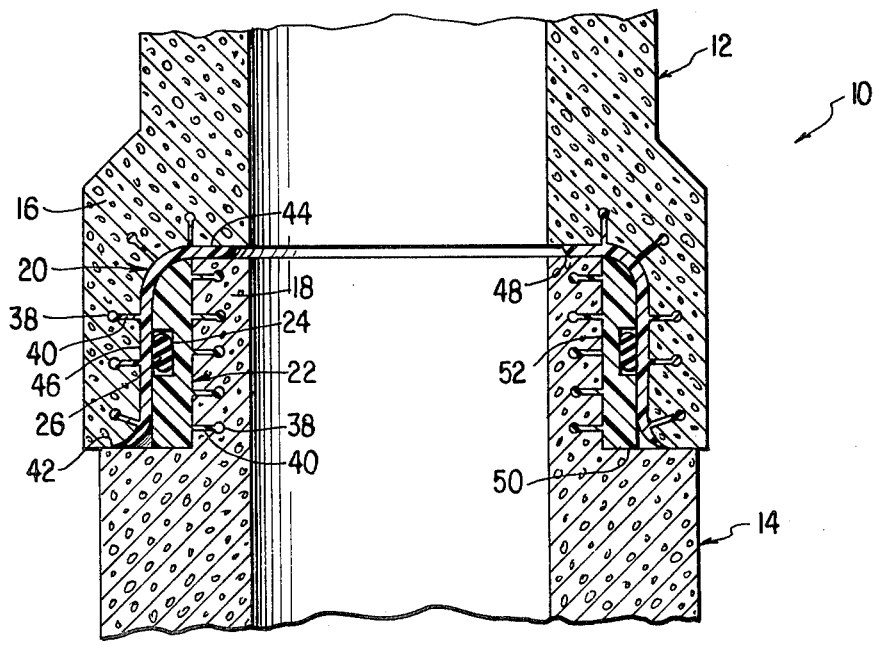
FIG. 7 is a cross section of two pipes in end-to-end engagement with the spigot end being engaged by the bell end of another pipe.

Referring to FIG. 7, there is shown a pipe joint 10 having a first pipe 12 joined end-to-end to a second pipe 14. The first pipe 12 has at one end a bell end portion 16 engaged with a spigot end portion 18 of the second pipe 14. The bell end portion 16 carries a bell end sealing ring 20 which circumscribes a spigot end sealing ring 22 carried by the spigot end portion 18 of the second pipe 14. The spigot end sealing ring 22 further includes a groove 24 which carries a flexible sealing O-ring 26. When the first and second pipes 12, 14 are engaged as shown, the surfaces of the spigot end sealing ring 22 and the bell end sealing ring 20 are engaged in contiguous relationship to compress the flexible sealing ring 26 to seal the joint. In this way, water or other fluid flowing through the pipe will not leak through the joint between the bell end portion 16 of pipe 12 and the spigot end 18 of second pipe 14.

The end sealing rings 20 and 22 are more clearly shown in FIGS. 1, 2, 3 and 4. These sealing rings have a particularly unique configuration which enhances sealing of the joint when the pipes are joined as shown in FIG. 7 as well as sealing the pipes along the surface between the end sealing rings and the portion of the pipe to which the sealing rings are fixed.

The spigot end sealing ring 22 includes a spigot exposed surface 28 and a spigot interfacing surface 30. The bell end sealing ring 20 has a bell exposed surface 32 and a bell interfacing surface 34. Upstanding from the interfacing surfaces 30 and 34 are upstanding members or sealing ridges 36 which extend continuously entirely around its respective end sealing ring. Each of these sealing ridges has a head 38 and a base 40 which is of a lesser thickness than the head 38. The head 38 enhances the ability of the ridges 20, 22 to be secured into place during molding process and to be maintained in place during the joining of the pipes 12, 14 and while the joined pipes are in operation. Specifically, the ridges 36 extend substantially equally spaced along the length of the interfacing surface 30, 34 of each bell end and sealing end ring 20, 22. With this configuration there is provided a continuity of barriers set up against the interface defined between the pipe 12, 14 and the interfacing surface 30, 34 of the end sealing rings 20, 22. This makes it practically impossible for water to leak from any area in the vicinity of the interface between the sealing rings 20, 22 and the pipe 14, 16.

In the preferred embodiment five sealing ridges 36 are shown spaced equidistantly entirely along the interfacing surface 30, 34 of the sealing rings 20, 22. Although it has been found that this is the preferred method of sealing, any number of upstanding members can be used so long as they provide a sufficient number of barriers along the interfacing surface 30, 34 of each end sealing ring. If only one or two such members 36 are used, there is a greater possibility that a path could easily be found which circumvents the barriers. Where a multiplicity of members are included, the possibility of such a path is reduced significantly to the point where such leakage along the interface is prevented.

Referring again to FIG. 7, it can be seen that the bell end 16 defines a bell end face 42 which is displaced axially and radially outwardly from a bell offset face 44. An inner surface 46 which is concentric with the axis of the pipe connects the bell end face 42 with the offset face 44 as shown. Similarly, the spigot end 18 defines a spigot end face 48 and a spigot offset face 50 which is displaced axially rearwardly from the spigot end face and radially outwardly therefrom. An outer surface 52 concentric with the axis of the pipe connects the spigot end face 48 with the offset face 50. The inner surface 46 of the bell end 16 has molded thereinto the bell end sealing ring 20 such that ring 20 extends from the end face 48 entirely along the inner surface 46 to the offset face 50. As can be seen, the upstanding members 36 extend perpendicularly from the interfacing surface 34 of the bell end sealing ring 20 through the inner surface 46 and into the pipe. In this way, the interface between the interfacing surface 34 and the inner surface 46 is sealed from leakage by the upstanding members 36.

The outer surface of the spigot end 14 carries the spigot end sealing ring 22 which extends substantially the entire length of the outer surface 52 from the offset face 48 to the end face 50. It should be further noted that the portion of the bell end sealing ring 20 adjacent the end face 42 is flared radially to enhance engagement with the spigot end of the adjacent pipe. On the other hand, the exposed surface 28 of the spigot end sealing ring 22 is champhered so that it can readily engage the exposed surface 32 of the bell end sealing ring 20 to cam the spigot end 18 into place and to ensure an effective seal between the end sealing rings. In addition, the spigot outer surface 52 extends at an angle radially from the end face of the spigot portion 14 to the offset face 50. Polyvinyl choloride (hereinafter PVC) end rings are used to provide for some deformation between the two members when they are pushed to engagement as shown to further seal the joints in addition to the seal provided by the compressed O-ring. Other plastic material may also be used.

Furthermore, by using PVC end rings, there is ensured that the spigot end and the bell end portions will smoothly engage one another and slide into place without the need for additional lubrication and without adversely affecting the sealing characteristics.

In addition, PVC end rings are sufficiently plastic to deform and compress under the action of the pipe material during the forming process. Under this deformation and compression, the end ring material will flow into interstices and cavities which may result during the forming process. As a result, better sealing characteristics are achieved between the pipe and the end rings 20, 22, particularly in the area of the ridges 36.

Figure 1:
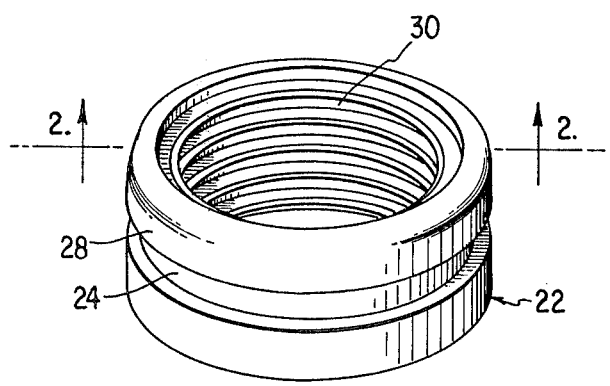
FIG. 1 is a perspective view of the spigot end sealing ring.
Figure 2:
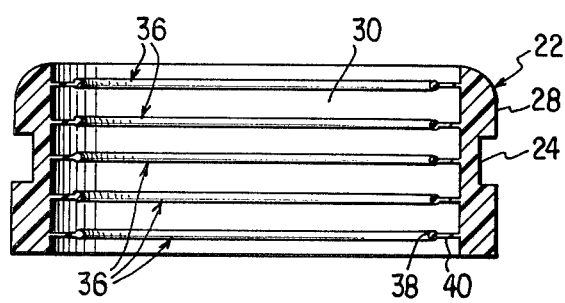
FIG. 2 is a cross section of FIG. 1 taken along lines 2—2.
Figure 3:
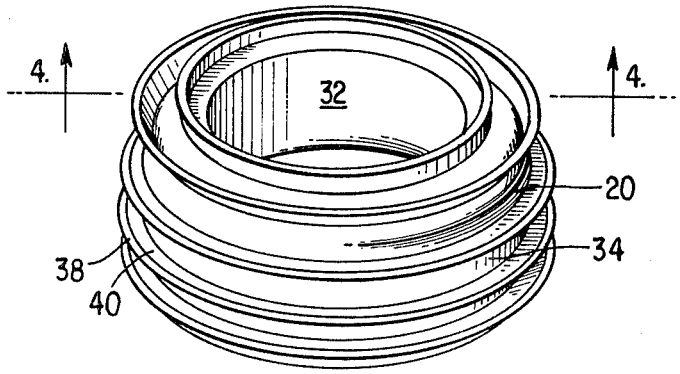
FIG. 3 is a perspective view of the bell end sealing ring.
Figure 4:
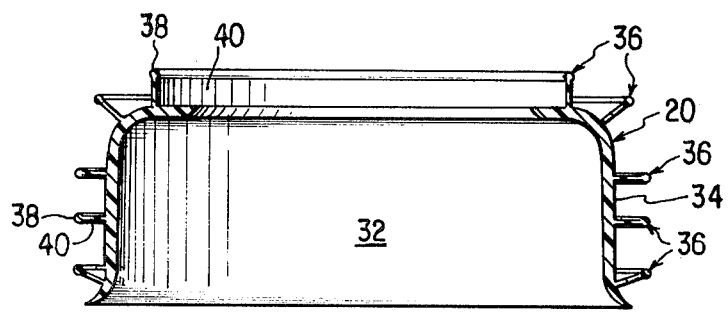
FIG. 4 is a cross section of FIG. 3 taken along lines 4—4.
Figure 5:
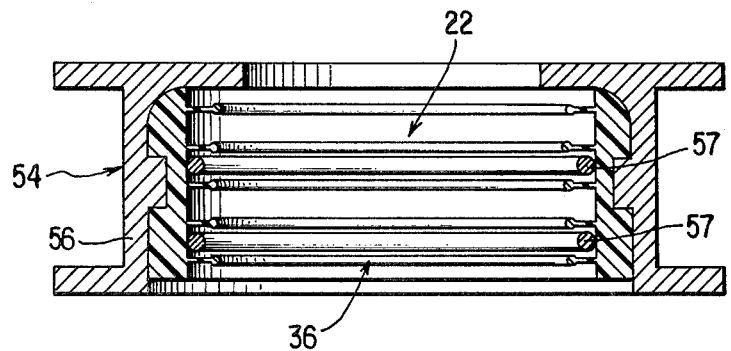
FIG. 5 is a cross section of a pipe being formed with the spigot end headers in place.
Figure 6:
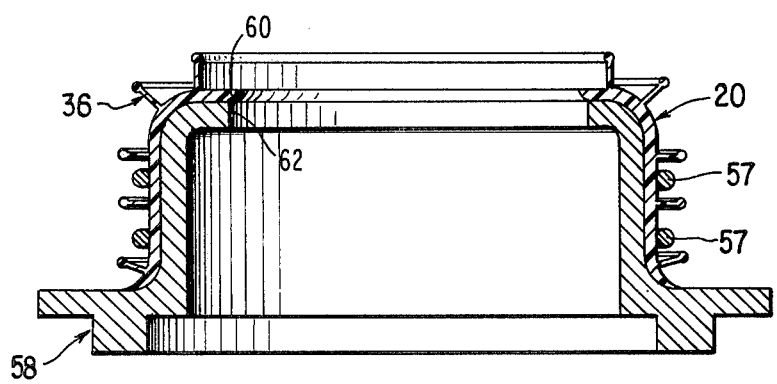
FIG. 6 is a cross section of the bell end of the pipe being formed with the bell end forming pallets in place.

Besides the sealing features discussed above, an additional advantage of the configuration of the sealing rings is their ability to be formed into the pipes without undue modification of the present system used in molding the pipes and the sealing rings together. In molding the end rings 20, 22 into place, a header 54 and a bell pallet 58 are used with the normal process for making the pipes. The apparatus for molding the pipes is not shown herein as it is well known to one skilled in the art obviating the need for reiteration in connection with the preferred embodiment of this invention. As can be seen, the spigot header 54 carries a snap ring 56 which extends entirely around the inner surface of the header 54. The snap ring is configured so that the spigot end sealing ring 22 having the groove 24 can simply be snapped onto the snap ring 56 at the groove 24 to hold it in place during the molding process. On the other hand, the bell end sealing ring 20 can be simply placed on the inner surfaces of bell pallet 58 as shown in FIG. 5 or it can be secured thereto by some convenient adhesive which allows the pallet to be easily withdrawn once the molding process is completed.

After the header 54 and pallet 58 have been in place supporting their respective end sealing rings, the slurry for the concrete is then allowed to flow into place to form the pipe. The slurry will flow in between the sealing ridges 36 and completely encircle the head 38 to secure the sealing rings 20, 22 in place. Once the slurry has hardened, the header 54 and pallet 58 can be withdrawn with the sealing ring permanently secured and effecting a seal at the interface between the interfacing surface 30, 34, and the outer surface 52 and the inner surface 56, respectively, of the spigot end 18 and the bell end 16.

In addition, resilient rings 57 can be employed to hold the sealing ring 20, 22 in place during the forming process. A split ring or helical ring can be used to this end. In any event, the resilient ring 57 has a normal diameter greater than that of the interfacing surface for each end sealing ring 20,22. The resilient rings 57 are compressed or expanded sufficiently to change their diameter so that they can be placed within the area circumscribed by the sealing ridges 36 when placed adjacent the pallet 58 and header 54. Once placed within this area, the resilient rings 57 are allowed to expand or contract sufficiently for engaging the interfacing surface of each sealing ring 20, 22. In this disposition, the resilient ring presses the interfacing surface with sufficient force to maintain the sealing rings 20,22 in place while the slurry is allowed to flow into the mold between the upstanding members of the sealing rings 20,22.

With regard to the forming process, it should be noted that the bell and sealing ring 20 includes an extension 60 which extends beyond inner surface 62 on the forming pallet 58. It is well known to those skilled in the art that in forming these pipes, there is often a gap which remains between the bell forming pallet 58 and the remainder of the apparatus used in forming the pipe. As a result, when the slurry is allowed to flow into the mold during the molding process the fine paste may leak out of a pipe through this gap resulting in a loss of density in that area of the pipe as it is finally formed. By having an extension 60 as shown, this gap is sealed to retain the fine paste within the mold and thereby ensure a more dense bell section. This is especially helpful in dry cast or wet cast pipe production but can also be used in other processes.

It should also be noted that in the preferred embodiment described herein and shown in the drawing the major portion of the exposed surfaces 28,32 are parallel with the axis of the pipe and concentric therewith. These exposed surfaces 28 and 32 may also have a taper to allow the joining of the pipes with their end sealing rings more readily. In this regard, a standard taper of 1° 50' has proved to be preferred for these purposes. In addition, although it is preferred that the exposed surfaces 28, 32 be in engagement to accomplish the sealing this is not absolutely necessary. Depending on the surrounding area and other variables where the pipe is being laid, this kind of engagement may not be readily accomplished. In this regard, the exposed surfaces 28, 32 may not be completely engaged but will be sufficiently engaged to allow compression of the sealing ring 26 to seal the joint.

It should also be understood that using the term pipe, it is contemplated that this include pipe portions of other elements used in systems which would employ such end sealing rings. For example, the intersection of a pipe with a manhole where the bottom portion of the manhole could include one portion of the bell end or spigot end of the sections as shown in FIG. 7.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced herein.

What is claimed is:

1. A system for joining pipe sections in end-to-end relation comprising at least a first pipe and a second pipe, said first pipe having a bell end and said second pipe having a spigot end, said ends defined by seal members embedded therein, said bell end being configured to receive said spigot end to form a joint between said first and second pipes, said bell end having an inner surface having at least a portion thereof formed by a bell end seal, said spigot end having an outer surface having at least a portion thereof, formed by a spigot end seal, said inner surface of said bell end circumscribing said outer surface of said spigot end when said pipes are in a joined relationship; so that said end seals engage one another when said pipes are in a joined relationship to seal said pipes at said joint between said seal members;

said end seal members further including integral means for sealing the interface defined between said end seal member and respectively, said bell end and said spigot end of said pipes, said means including a series of continuous ridges extending from said seal members and embedded in said pipe, whereby said end seals are in a joined relationship with the respective pipe ends to seal the interfaces therebetween.

2. The system according to claim 1 further comprising means for containing a plastic sealing member between said bell end seal and spigot end seal for effecting said seal.

3. The system according to claim 2 wherein said flexible sealing member is an O-ring completely circumscribing said spigot end seal.

4. The system according to claim 3 wherein said plastic sealing member includes an O-ring having flat under portion for engaging one of said end seals and a ground upper portion for engaging said other end seal.

5. The system according to claim 1 wherein each of said ridges has a base portion and a head portion, said head portion having a thickness greater than said base portion for securing said end seal to said pipe.

6. A system for joining pipes in end-to-end relation including a first pipe and a second pipe, said first pipe having a bell end and said second pipe having a spigot end, said spigot end having a spigot end face and a spigot offset face spaced axially from said end face, the spigot end further defining an outer surface between said end face and said offset face;

said bell end defining a bell end surface and a bell offset surface spaced axially inwardly from said bell end surface, said bell end further defining an inner surface connecting said bell end surface and said bell offset surface;

said spigot end carrying a spigot end sealing member extending from said spigot end surface along said outer surface to said spigot offset surface, said spigot end sealing member carrying integral means at an interfacing surface embedded in said pipe end for sealing the interface between said interfacing surface and said outer surface of said spigot end;

said bell end carrying a bell end seal extending from said bell end offset surface to said bell end surface, said bell end sealing member carrying integral means at an interfacing surface embedded in said pipe end for sealing the interface between the interfacing surface and said inner surface between said offset end and said bell end surface;

said spigot end seal further defining a sealing surface, said sealing surface sloping upwardly from said spigot end surface to said offset end;

said bell end sealing member defining a sealing surface covering at least a portion of the end surface, sloping downwardly and inwardly from said bell end surface toward said bell offset surface, and covering at least a portion of the offset surface, said sealing surface of said bell end sealing member being complementary with said sealing surface of said spigot end sealing member for sealing the joint between said pipes when said spigot end is pressed into engagement with said bell end bringing said sealing surfaces into engagement.

7. The system according to claim 6 wherein said sealing surfaces are continuous surfaces.

8. The system according to claim 7 wherein said bell end sealing member defines a sealing surface, a portion of which between each of said end surface and said offset surface is a continuous straight surface concentric with the axis of the pipe.

9. A system according to claim 8 wherein said spigot end sealing member defines an annular groove for receiving a resilient sealing member.

10. The system of claim 6 wherein the sealing surfaces of said end sealing members slopes at a taper of 1° 50′ to the longitudinal axis of said members.

* * * * *